(12) United States Patent
von Groll et al.

(10) Patent No.: US 7,664,693 B1
(45) Date of Patent: Feb. 16, 2010

(54) FINANCIAL METHODOLOGY FOR THE EXAMINATION AND EXPLANATION OF SPREAD BETWEEN ANALYST TARGETS AND MARKET SHARE PRICES

(75) Inventors: Goetz von Groll, Zurich (CH); Dag Dyrdal, Oslo (NO); Stoyan Mihov, Sofia (BG); Christofer Solheim, London (GB)

(73) Assignee: CommEq Ltd., London (GB)

( * ) Notice: Subject to any disclaimer, the term of this patent is extended or adjusted under 35 U.S.C. 154(b) by 499 days.

(21) Appl. No.: 11/309,049

(22) Filed: Jun. 13, 2006

Related U.S. Application Data (60) Provisional application No. 60/595,175, filed on Jun. 13, 2005.

(51) Int. Cl.
*G06Q 99/00* (2006.01)

(52) U.S. Cl. .............. 705/36 R; 705/5; 705/1; 705/36 T (58) Field of Classification Search ........... 705/36 R, 705/35, 37, 1, 36 T, 5; 273/237
See application file for complete search history.

(56) References Cited

U.S. PATENT DOCUMENTS

| | | | | |
|---|---|---|---|---|
| 4,363,489 A | * | 12/1982 | Chodak et al. | 273/237 |
| 7,467,108 B2 | * | 12/2008 | Papka | 705/36 R |
| 2003/0135445 A1 | * | 7/2003 | Herz et al. | 705/37 |
| 2005/0060288 A1 | | 3/2005 | von Groll | 707/3 |
| 2009/0055324 A1 | * | 2/2009 | Papka | 705/36 R |

OTHER PUBLICATIONS

Robert J. Shiller, Bubbles, Human Judgement, and Expert Opinion, May 2001, Cowles Foundation Discussion Paper No. 1003.*

* cited by examiner

*Primary Examiner*—Behrang Badii
(74) *Attorney, Agent, or Firm*—Buckley, Maschoff & Talwalkar LLC

(57) ABSTRACT

A financial methodology for examining, explaining and predicting the spread between analyst targets and stock prices, by analyzing how investor confidence is impacted by media coverage and correlating this to the spread. The methodology is based on a quantitative approach suitable for numerical processing. It measures the confidence along several categories, and allows for industry benchmarking.

4 Claims, 8 Drawing Sheets

FINANCIAL METHODOLOGY FOR THE EXAMINATION AND EXPLANATION OF SPREAD BETWEEN ANALYST TARGETS AND MARKET SHARE PRICES

BACKGROUND

Just in the United States, more than 80 million people invest and speculate in the shares of thousands of publicly traded companies and in many other financial instruments. The day to day price of a given instrument is essentially a manifestation of the investors' (or sellers, brokers, advisors and other market participants') confidence in the future financial performance of a company or the price of a commodity.

Equity investors obtain some information directly from the listed corporations, perhaps through corporate websites, conference calls or mail. However, tight regulatory restrictions regarding shareholder communication and the obvious need for unbiased opinion mean that investors rely chiefly on indirect channels, principally financial analysts and media.

Analysts employ numerically based models of the commodities or businesses they track, including the associated industry and economic parameters. They must weigh up different factors, pulling in different directions, to arrive at buy/sell recommendations and price targets/fair price estimates.

SUMMARY

The disclosed system and methodology addresses the influence media, by identifying and quantifying the impact of one or more related media factors and analyzing their combined effect to provide commercial solutions such as:

Identify business and communication practices associated with exceptional (e.g. above average) media coverage, which, in turn, is associated with impact on equity prices, revenue growth, market share, or profitability. Quantify potential risks/benefits, so that clients can consider changing business and communication practice, whether promotional or defensive and measure this effectiveness over time, by sector, by organisation and by brand or product. Examples of communications which can be improved cover all aspects of public reputation or brand-building including, inter alia: Proactive issues management including long term contextual communications in areas of vulnerability—such as environmental damage or human health risk; Sponsorship selection and activation—such as for sports properties or celebrities; Corporate & social responsibility (CSR) activities and corporate giving including communications around good environmental practice, educational support and support for the arts; Enterprise change communications designed to achieve attitude shift or behavioural change amongst specific groups or enterprise-wide including post-merger communications; Governmental and regulatory affairs to deny, defend against and/or develop legislation, depending on analysis of potential damage or benefit to reputation or business performance; Real-time or periodic campaign messaging analysis to judge impact of different elements (e.g. by brand, business unit, geography) on share price;

Identify trading opportunities when, for example, particular media coverage is driving widening or closing of the spread between stock price and analyst targets.

Broadly speaking, it is not practically possible to identify the discrete influence of the editorial factors, as opposed to the influence of the business substance in the articles, simply by the direct analysis of media coverage.

The disclosed methodologies proceed from the assumption/observation that media's overall influence can be identified more precisely by examining the gap/spread between the confidence levels of investors/sellers (expressed as the current trading price) and the analyst model confidence (expressed as the fair/target price). By examining media coverage during thousands of trading/news days where and when there is a significant spread, numerical analysis, for example, correlation analysis, can be used to identify a specific influence of the media coverage, including editorial coverage. The hard business parameters are already reflected in the analyst's target price and they are therefore previously eliminated. The combined effect of the individually identified factors can be modeled using proprietary methodology disclosed herein. This can include specific processes to identify and quantify the cross-over effects which can occur when broader on-going issues or third party interests converge with coverage that is price sensitive to the company or commodity in question.

Disclosed is a system and method for analysis of media influence on a value of a financial instrument. An exemplary method includes establishing a model by characterizing a first media trend and a corresponding historic parameter of a financial instrument. The model can be established through the training process of the model, which will be described in more detail later. The model is executed by inputting a parameter of a financial instrument of interest and data developed by characterizing a present media trend related to the specific financial instrument into the model. An analysis is performed of the data characterizing the present media trend and the parameters of the financial instrument of interest using the model. Results of the analysis are output.

The disclosed system and method for analysis of media influence on a value of a financial instrument comprises another embodiment including inputting a parameter of a financial instrument of interest and data developed by characterizing a present media trend related to the specific financial instrument into the model. An analysis is performed of the data characterizing the present media trend and the parameters of the financial instrument of interest using the model. Results of the analysis are output.

The method can also be implemented on a computer and be embodied on a computer readable medium which is executed on a computer. The computer readable medium can be any medium that is capable of being read by a computer.

BRIEF DESCRIPTION OF DRAWINGS

Exemplary embodiments will be described in relation to the following figures wherein.

DESCRIPTION

A related application (Ser. No. 11/308,886), the entire contents of which are incorporated by reference, has been filed for examining a more sudden and transient impact of events' coverage in the media and subsequent movements of stock prices (or other financial instruments) triggered by the coverage.

Stocks of companies can trade well outside the range of analysts' target prices, which is known as "spread". The disclosed methodology concerns that spread; understanding, explaining, modeling and forecasting the component of the spread that is due to media-driven investor/seller confidence impact. The method uses historical analysis of the spread against coterminous media coverage, combining statistical analysis and human expertise to discover, weight, model and then predict the influential factors.

Securities analysts and investors employ quantitative valuation models of financial instruments to forecast. Examples of such financial instruments are stocks, bonds, commodities, currencies as well as derivative structures thereof such as a hedge on the volatility of a composite index. Important parameters of the financial instruments themselves may be (but are not limited to): stock/instrument trading (or target fair market) price, trading volume, volatility, yield curves and similar parameters. Embodiments of the disclosed method besides valuation models determine the on-going influence of media coverage on the confidence of investors and other key stakeholders in a specific business, its leaders, products and trading prices of the related financial instruments. Business in this context can be an individual company or a whole industry, and the same approach may also be used for other economic entities and their related financial instruments such as commodities, currencies, and government bonds. These influences of media coverage are termed in this document as confidence subjects and can fall into the following subject areas, (which is for illustration purposes and is not meant to be exhaustive):

Reputation of company leaders, such as CEO, CFO

Key Products and factors such as Quality, Pricing, Innovation

Corporate and industry specific issues such as Corporate Social Responsibility (CSR), transparency, activities and pricing in developing world.

Reporting financial items such as earnings/revenues, large contract wins

Confidence Subjects can be subjects, related to public perception of a business, that influence the fiscal performance of the business. A business can include commodities, bonds, currencies or other financial instruments or institutions, the fiscal performance of which can be influenced by public perception.

To make these confidence subjects amenable to a numerical approach, the entity under investigation or financial instrument of interest receives a real-numbered value or score $s_i \in \Re$ (where the sign of the value indicates a positive or negative rating). The scores can be computed for certain time intervals and therefore a media trend over time can be observed. The score $s_i$ is typically computed with such media trend characteristics to be captured in quantitative terms, such as volume of articles published per day, the weight of the articles themselves (to account for prominence) and the publications in which the articles are published, the tonality of the articles. Tonality is a parameter to capture the sentiment expressed in the media, for example in determining if an article on a particular issue as positive or negative from the perspective of the subject company. In order to apply tonality in the disclosed system methodology, it can be cast into quantitative terms.

A hypothetical media trend can be the reputation and media coverage of a CEO of a company increasing markedly (and as a consequence of the company becoming more popular the spread between fair value derived with financial fundamental analysis and trading price of the company stock is widening). The score values making up media trends in the confidence subjects can be correlated against movements in the parameters of related financial instruments, such as stock price or volatility.

Figure 1:
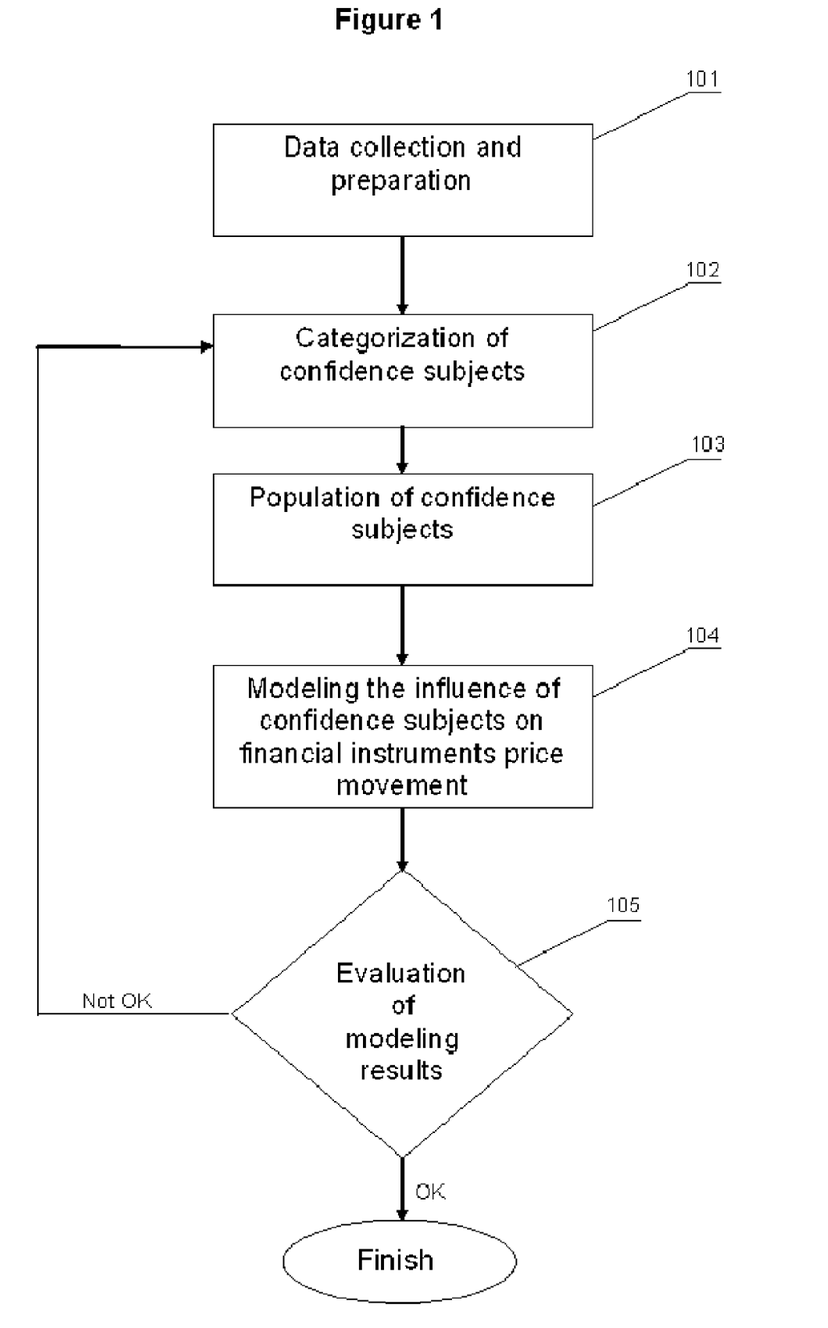
FIG. 1 illustrates exemplary processes for establishing a trained model of an exemplary embodiment of the disclosed method.

Embodiments of the disclosed method and system involve the following processes:

(1) Training: Compiling correlation reference material from historical data (FIG. 1)

Data collection and preparation (block 101)

Categorization of confidence subjects (block 102)

Population of confidence subjects (block 103)

Modeling the influence of confidence subjects on financial instruments (block 104)

Evaluation of the modeling results and refining the model to enhance the precision (block 105)

Figure 2:
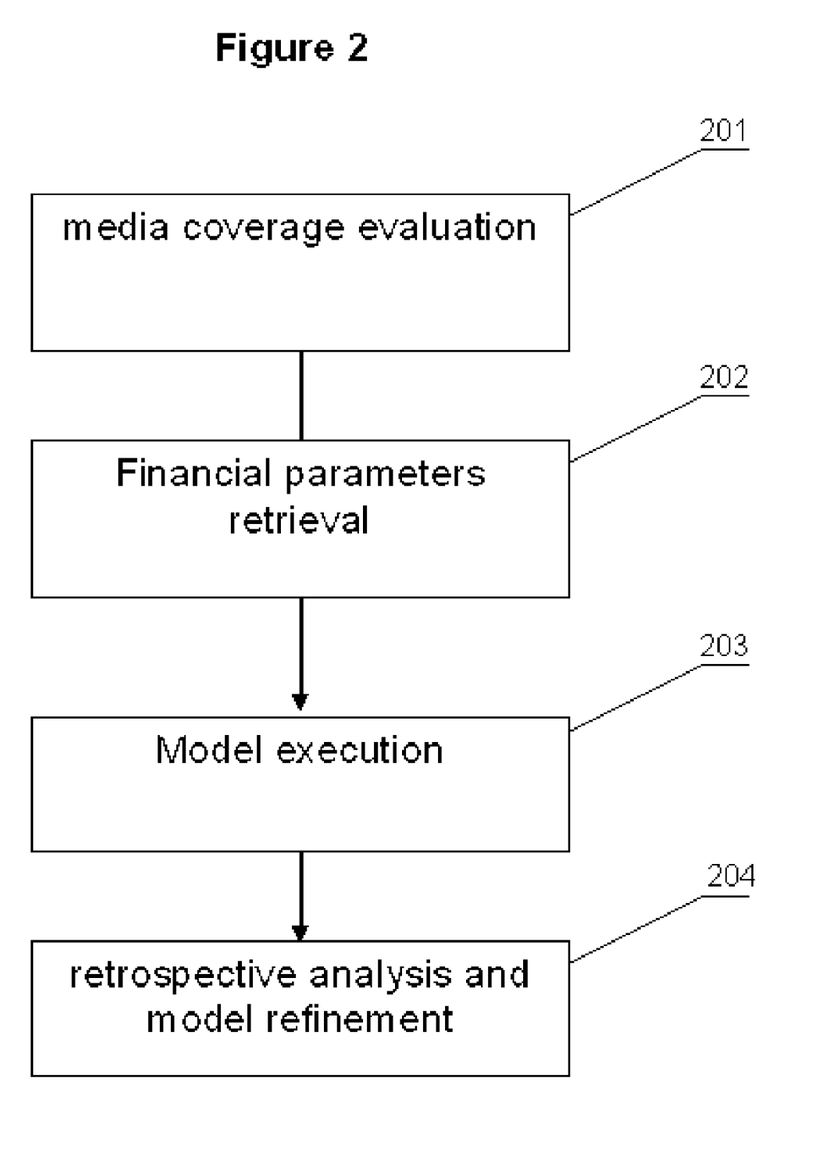
FIG. 2 illustrates exemplary processes for outputting values based on analysis using the model of FIG. 1 in an exemplary embodiment of the disclosed method.

(2) Outputting Values: Prediction using correlations for analysis of current variance between stock price targets and market prices (FIG. 2)

Evaluate media coverage according to confidence subjects (block 201)

Retrieve financial parameters of affected financial instrument(s) (block 202)

Model execution: compile trends in confidence subject coverage and associated indications on spread (block 203)

Retrospective analysis of the results and refinement of model (block 204)

An exemplary embodiment of the invention is described herein in the context of a company in the pharmaceutical industry. The exemplary methodology can predict a difference (delta) between a share price and an analysts' opinion of fair value based on present media coverage.

For the purpose of illustration we can consider the needs of a fictitious pharmaceutical company, DrugCo, listed on the London stock exchange. A new CEO has been appointed replacing one who had presided over a period of underperformance driven by doubts over the research pipeline for new drug development and concerns over drugs whose patents are to expire in the near future. Because of the nature of long lead times in the industry, the research pipeline is a key fundamental driver of fair share value. Therefore—other than financial manipulation or takeover activity—stock price performance can only be improved short term, for example, by driving more effective communications around existing brands and products, company policy, and/or quality of management.

Table 1 presents the media coverage evaluation for each of the confidence subjects A-H related to a specific financial instrument of interest, which could be a stock, bond corporation or business. Each of the impact values $I_i$ (where i is an index for A-H) is derived by summing the articles ($a_j$) for a given period on the subject multiplied by their tonality and further multiplied by a corresponding prominence factor (explained in more detail below). Each of the impact values is summed and an overall impact value I is determined by summing $I_i$. The overall impact value I can be used as a multiplier against present share price to determine the impact or share price. The column "Change" is a value representing the percentage change in value for each of the subjects in the two months, for example, March and April.

The prediction of the impact $I_i$ performed by multiplying the change values $C_i$ for each of the confidence subjects by selected coefficients $R_i$. The impact equation is $I_i=C_iR_i$ where the index i stands for a particular confidence subject A-H, $C_i$ represents the change values, $R_i$ are the coefficients (which are derived in the training process. The coefficients ($R_i$) expressing this relationship may be, but are not limited to, correlation coefficients, covariance coefficients, or path coefficients as determined by the statistical method employed. $I_i$ in an impact value which represents the impact of the particular confidence subject change to the share price delta. The final change in share price, in this example, is derived by summing the impacts on all of the confidence subjects $\Sigma I_i$ (in the example presented in Table 1. A delta in share price against fair value determined by multiplying the summed impact values by the reset target value of -3.37% is predicted). The equation $\Sigma I_i = \Sigma\Sigma\Delta(t_{i,j}a_{i,j}p_{i,j})R_i$, where $\Delta$ is the change in value of the term in parentheses over two points in time, $t_{i,j}$ is the tonality of an article j about confidence subject i, multiplied with an article weighting factor (prominence) $a_{i,j}$, multiplied by a weighting factor $p_{i,j}$ of the publication source, $R_i$ is the coefficient for confidence subject i, and $I_i$ is the resulting impact on financial instrument for each confidence subject i. This Equation is the same that is used to train the model.

After comparing this outcome to the actual share price retrospectively (either in ongoing operation or during testing with historical media and financial data) the impact coefficients $I_i$ in the model are refined.

TABLE 1

|  | March | April | Change | Coefficient | Impact |
|---|---|---|---|---|---|
| A. Financial reporting/transparency | -133 | 23 | 117.29% | 0.013 | 0.015248 |
| B. Corporate Social Responsibility (CSR) | 178 | 190 | 6.74% | 0.005 | 0.000337 |
| C. Pricing | 331 | 312 | -5.74% | 0.012 | -0.00069 |
| D. Profit margins | -318 | -334 | -5.03% | 0.008 | -0.0004 |
| E. Pipeline/innovations | 24 | 28 | 16.67% | 0.011 | 0.001833 |
| F. Patents | 412 | 380 | -7.77% | 0.006 | -0.00047 |
| G. CEO reputation | -25 | -84 | 236.00% | 0.021 | -0.04956 |
| H. Product withdrawal | 0 | 0 | 0.00% | 0.024 | 0 |

TABLE 1-continued

|  | March | April | Change | Coefficient | Impact |
|---|---|---|---|---|---|
| Delta fair market share price value (present share price × sum of impact values) |  |  |  |  | -3.37% |

For instance, to provide more context of how the approach can be used not only for financial transactions alone but also by the companies themselves, the example could be part of the wider activities of DrugCo to

- assess the performance of companies (in its industry and beyond) that have had new CEO's and the messaging related to quality of management and especially the CEO him/herself that has been associated both with dramatic and surprising share price movements;
- benchmarks DrugCo against its peer group over a considerable period with respect to media communications to establish if there are any legacy issues, positive or negative;
- map out a CEO-led media communications plan to conduct a series of 'what if' analyses to help test optimum messaging, frequency and media i.e. the combination most likely to move share price.

Training Process

Details of the exemplary training process given in FIG. 1 will now be described with respect to FIGS. 3-9. An example using media coverage for three companies X, Y, and Z from the pharmaceutical industry has been monitored will be described. For the confidence subjects (A-H) under consideration in this example, the values for three consecutive months have been recorded. Table 2 shows the percentage changes for the values of the confidence subjects (A-H) for the three monitored companies, Table 3 shows the measured absolute values from which the changes in Table 2 were derived.

TABLE 2

|  | Change JAN | Change FEB | Change MAR |
|---|---|---|---|
| Company X |  |  |  |
| A. Financial reporting/transparency | 2.26% | -9.30% | 12.89% |
| B. Corporate Social Responsibility (CSR) | 8.68% | -2.30% | -19.88% |
| C. Pricing | 321.74% | -4.21% | -25.01% |
| D. Profit margins | -0.18% | 14.29% | -16.27% |
| E. Pipeline/innovations | -112.89% | 10.57% | 101.44% |
| F. Patents | 44.02% | -14.32% | 16.19% |
| G. CEO reputation | 102.73% | -18.82% | 9.62% |
| H. Product withdrawal | -38.84% | -2.80% | -5.36% |
| Delta share price fair value | 3.26% | -0.16% | 0.36% |
| Company Y |  |  |  |
| A. Financial reporting/transparency | -11.11% | 93.14% | -30.50% |
| B. CSR | 2.66% | -1.30% | -4.50% |
| C. Pricing | -49.16% | 9.62% | -138.04% |
| D. Profit margins | -12.91% | 32.97% | -21.24% |
| E. Pipeline/innovations | 15.30% | -31.42% | 8.13% |
| F. Patents | -20.87% | 18.38% | 6.35% |
| G. CEO reputation | -31.89% | 7.66% | 35.59% |
| H. Product withdrawal | 2.43% | 27.49% | -13.59% |
| Delta fair market share price value | -1.21% | 2.50% | -2.39% |

TABLE 2-continued

|  | Change JAN | Change FEB | Change MAR |
|---|---|---|---|
| Company Z | | | |
| A. Financial reporting/transparency | −10.81% | −59.64% | 9.71% |
| B. CSR | 2.70% | 6.10% | −20.78% |
| C. Pricing | 7.70% | −100.33% | 11.28% |
| D. Profit margins | −3.23% | −8.14% | −120.40% |
| E. Pipeline/innovations | −15.00% | 29.87% | −3.24% |
| F. Patents | −6.15% | 5.52% | −25.89% |
| G. CEO reputation | 20.14% | −23.39% | 0.22% |
| H. Product withdrawal | −131.04% | −1.31% | 2.16% |
| Delta share price fair value | −3.19% | −1.97% | −2.78% |

TABLE 3

|  | January | February | March | April |
|---|---|---|---|---|
| Company X | | | | |
| A. Financial reporting/transparency | −510.366 | −394.934 | −762.277 | 220.1847 |
| B. CSR | 386.2064 | 721.5245 | 555.9074 | −549.04 |
| C. Pricing | 25.36498 | 841.4474 | 487.2668 | −731.255 |
| D. Profit margins | −944.96 | −962.32 | 412.4928 | −258.67 |
| E. Pipeline/innovations | −73.5241 | −903.508 | 51.80147 | 577.2752 |
| F. Patents | −281.819 | 958.6239 | −413.9 | 256.24 |
| G. CEO reputation | −81.695 | 757.576 | −668.158 | −25.3001 |
| H. Product withdrawal | 153.6516 | −443.158 | −567.085 | −871.166 |
| Company Y | | | | |
| A. Financial reporting/transparency | 460.5606 | −51.0346 | 424.311 | −869.784 |
| B. CSR | 425.7878 | 539.1298 | 469.277 | 257.9952 |
| C. Pricing | −99.6898 | −589.788 | −22.155 | −327.989 |
| D. Profit margins | 865.1543 | −251.65 | 578.1333 | −650.024 |
| E. Pipeline/innovations | −845.302 | 447.783 | −959.196 | −179.617 |
| F. Patents | 562.1655 | −611.264 | 512.1824 | 837.3144 |
| G. CEO reputation | 367.4253 | −804.434 | −188.536 | 482.397 |
| H. Product withdrawal | −718.279 | −544.051 | 951.746 | −341.239 |
| Company Z | | | | |
| A. Financial reporting/transparency | 858.1593 | −69.0855 | −481.116 | −13.9289 |
| B. CSR | 450.1893 | 571.7226 | 920.4596 | −992.527 |
| C. Pricing | −280.861 | −64.5486 | −712.133 | 91.05505 |
| D. Profit margins | 666.1786 | 450.8957 | 83.94699 | −926.757 |
| E. Pipeline/innovations | 579.7746 | −289.962 | 576.1534 | 389.4405 |
| F. Patents | 645.2567 | 248.2267 | 385.1321 | −611.791 |
| G. CEO reputation | −726.284 | 736.371 | −985.771 | −964.532 |
| H. Product withdrawal | 66.27713 | −802.195 | −907.064 | −710.914 |

Figure 3:
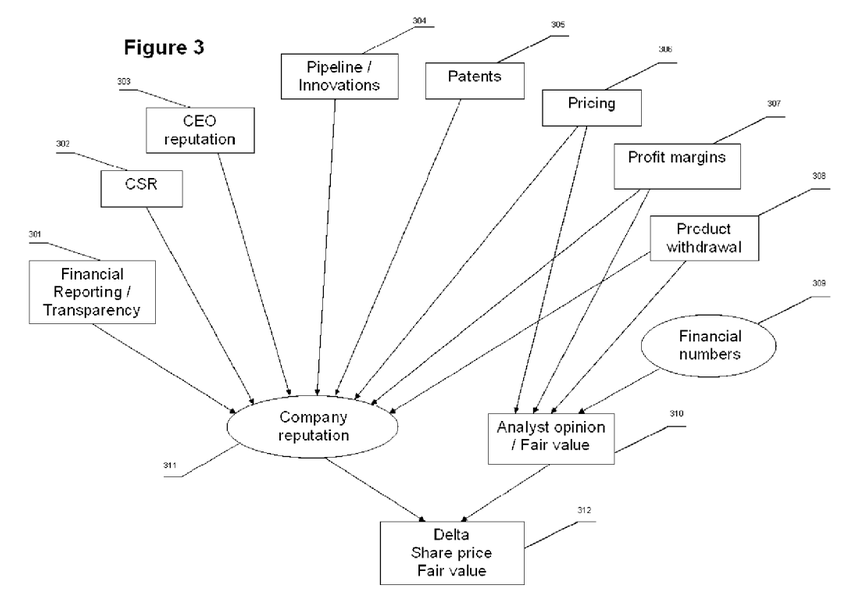
FIG. 3 illustrates exemplary inputs that are factored into the establishment of a trained model according to an exemplary embodiment of the disclosed method.

Using structural equation modeling (SEM) techniques, the model presented in FIG. 3 has been derived. Software SEM applications such as EQS, LISREL or MPlus can be used for establishing or training the model. The impact coefficients given in the corresponding column in Table 1 are calculated from the model.

Figure 4:
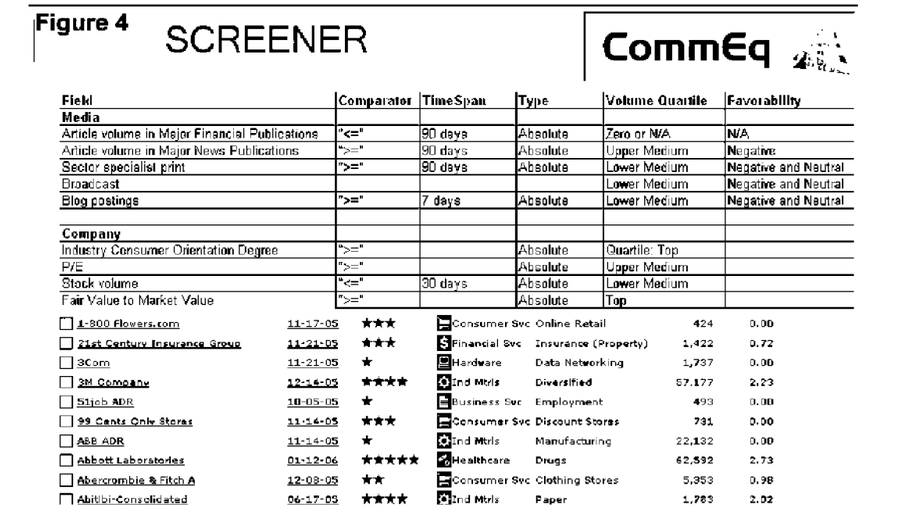
FIG. 4 illustrates an exemplary screenshot of graphical user interface used to determine the financial instruments that will be input into the model according to an exemplary embodiment of the disclosed method.

It is important to note that the model, the actual confidence subjects, the impact coefficients and the prediction process are not limited to the ones presented in the examples. They can be obtained in various ways by the analysis of the historical media coverage for the corresponding industry, size of companies and zeitgeist. FIG. 4 shows an embodiment of how one could narrow down the universe of companies to those that will form part of the training set. The top half shows a set of media coverage (volume/type of publication) and financial (P/E ratios, volatility) selection criteria, and the bottom half shows a list of candidate companies matching those criteria.

Figure 5:
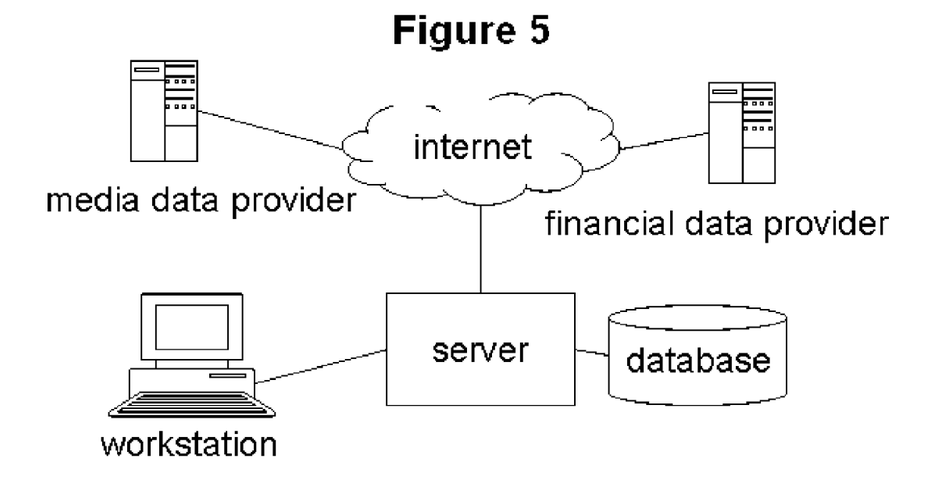
FIG. 5 illustrates an exemplary embodiment of a system on which an exemplary embodiment of the disclosed method can be implemented.

While the processes described herein may be carried out manually, the preferred embodiment consists of a computer system such as depicted in FIG. 5. The system may comprise one or more workstations having a computer-readable medium embodied with a program for executing the disclosed method on which users enter certain data and instructions, typically via specially designed graphical user interfaces (GUI) which can also display the results of the analysis. The data input is analyzed and the result is output, typically again in form of graphical output on a display of the workstation. The workstation can be connected with a central server that co-ordinates the various requests coming from the workstations and controls the running of the database (or grid systems of multiple databases). The databases can store historical data and results of the analysis, which can be updated. The same or a connected different server can be used to gather and transform the data received from the various service providers, typically through the Internet.

Figure 6:
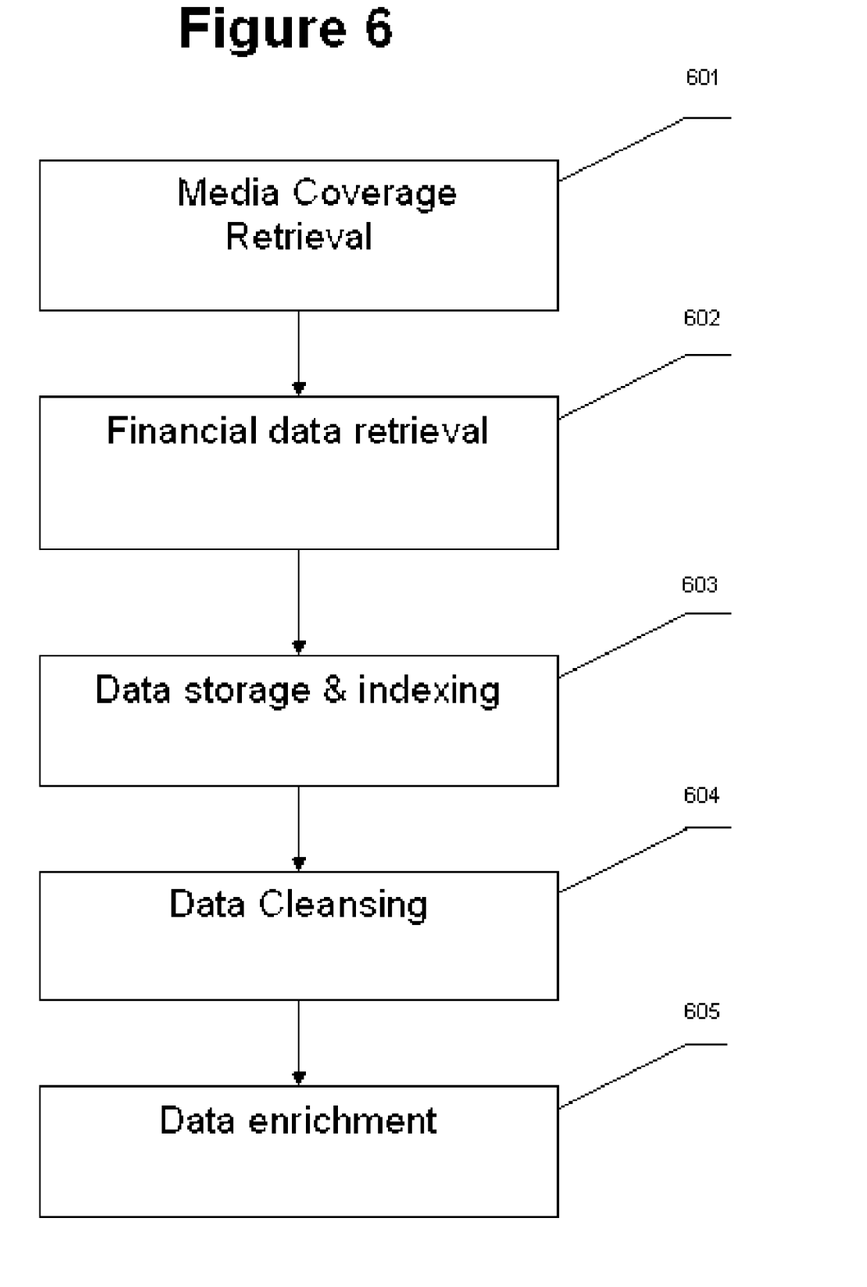
FIG. 6 illustrates exemplary processes for gathering media coverage and historical data regarding financial instruments, including those of interest, according to an exemplary embodiment of the disclosed method.

Data collection and preparation of element 101 of FIG. 1 can be implemented via the exemplary FIG. 6, which depicts the steps to gather media coverage and historical data regarding business subjects for training and for specific financial instruments of interests: There are various aspects to the task of data preparation, such as data gathering, storage & indexing, cleansing, and enrichment. These tasks are typically carried out by a computer system with features such as follows:

Data gathering can include retrieving media and financial data (601 and 602, respectively) from different providers. Examples of such providers are Reuters or Thomson, but also specialists such as ShadowTV who provide computer-searchable transcripts of TV broadcasts. An example of an embodiment of the gathering process is as follows: a human being specifies in a graphical user interface (GUI) on the workstation the details of desired data sets, such as date ranges and companies. The workstation communicates this data to a server computer system. The server transforms the user entry to send an HTTP request via the Internet to the service provider, where the URL used in the HTTP request contains the query details such as the date ranges and desired objects. The service provider responds with delivering (also via HTTP through the Internet) an XML or comma separated value (CSV) file (the news or financial feed).

Data storage & indexing (603) can include parsing the retrieved information and storing it in a structured way such as a computer database. The computer database can be either linked by a computer network to or is part of the computer system that gathered the data. The database can ensure by its design the connection between various data sub-sets organized in tables. For reasons set out in the description of the data processing in the latter section of this document, it can be beneficial to store and index articles according to such data elements as article title, the publication it appeared in, the date of publication, as well as a summary or article "snippet" or in any desired fashion.

Data cleansing (604) includes removing or adjusting parameter values that would hinder the correct subsequent processing of the data for a desired application. An example of a part of the cleansing is to properly account for stock splits and dividend payments. Stock splits in particular are typically in a 2 to 1 or even higher ratio that could, if not accounted for, heavily skew analysis because of the drastic change in stock price on the day of the split.

Data enrichment (605) includes adding data elements that were not included in the data feed of the service providers. For example in an embodiment, the publications are identified in the news feed by name, but their distribution volume, geographical location of main readership, type of publication such as general daily newspaper or specialist weekly trade magazine are added to the database manually if unavailable. Such a categorization allows for classifying and weighting the importance of articles by publication. A further example is the calculation of the present fair market value of a financial instrument based on analysts' 12 month target prices: $NPV=(T_A+d)/(1+r_e)$ where NPV=implied today's net present value, $T_A$=analyst 12 month target, d=dividends that are expected to be paid out in this interval, $r_e$=expected return rate accommodating risk, which in turn can be calculated, using, for example, the known Capital Asset Pricing Model to discount for a firm-specific risk, as $r_e=\alpha+\beta(r_M-\alpha)$, where $\beta$="beta" for a firm, $r_M$=expected return rate of the market portfolio, $\alpha$=risk-free rate of return.

Data gathering also includes identifying a parameter value of a plurality of financial instruments that have a large spread between the fair value of the plurality of financial instruments estimated by financial analysts and the actual parameter value of the plurality of financial instruments at a particular time within the validity of the estimate.

Figure 7:
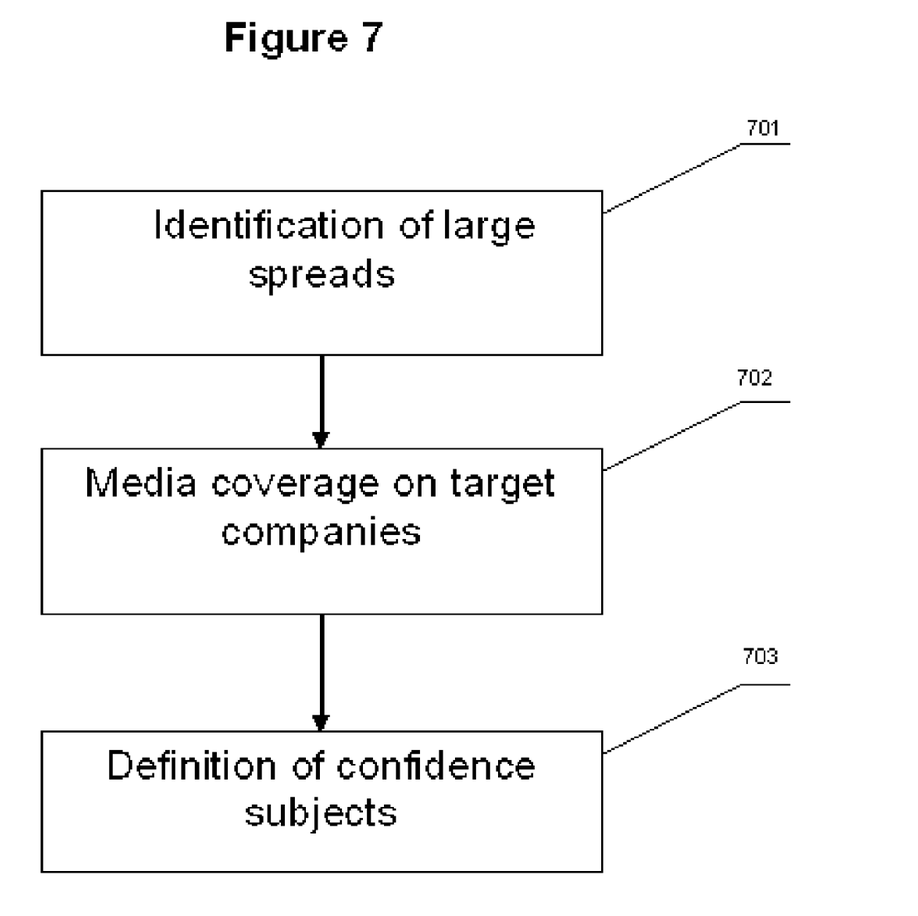
FIG. 7 illustrates exemplary processes in categorizing confidence subjects according to an exemplary embodiment of the disclosed method.

Exemplary details regarding the categorization of confidence subjects in block 102 in FIG. 1, is shown in FIG. 7 can include filtering to identify companies, commodities or currencies that have, over periods of time, had a spread exceeding a threshold between the market/trading price of the financial instrument and the analysts' price targets/fair value estimations of the financial instrument (701). The spread threshold can be predetermined by the user. Given the available historical data of press coverage, the relevant media coverage about companies, commodities, or currencies is identified (702). A set of confidence subjects are proposed that make up a "chart of accounts" by analyzing the coverage (703). This "chart of accounts" can have confidence subjects such as those shown in Table 2, although other company, commodity or currency-specific confidence subjects can be monitored and characterized. The confidence subjects identified in the past media coverage are related to the historic parameters, such as past financial reporting, pricing, profit margins and the like.

The confidence subjects for a particular company can be made up of general subjects in common with all companies (such as reputation on company leaders), industry specific subjects such as particular regulations, and/or firm-specific subjects which are unique to the company.

Population of confidence subject values (103 in FIG. 1) can be performed for each of the confidence subjects by characterizing the first media coverage (when training a model, or by characterizing present media coverage when using the model for a specific financial instrument of interest. The confidence subject values can be determined by analyzing the tonality and prominence factors of the media coverage with respect to the identified confidence subject. A "score card" of positive, negative, and neutral articles for a specific time period can be made. The score cards can include the volume of articles where the confidence subject is mentioned alongside an evaluation of the tonality (an exemplary embodiment can use the scale −2, −1, 0, 1, 2).

Tonality is a subjective review of the media coverage, where a score of −2 is very negative, a 0 score is neutral, and a +2 is very positive. These volume and tonality values can be weighted by the importance of the news source, for example the prominence of the article (currently a factor of 2, for example, for front page and less as the article moves back or where the related story appears in a television news broadcast), and a scale of, for example, 1-10 for the reach of the newspaper (for example with highest to Financial Times and Wall Street Journal, lowest to local press) and circulation.

The overall value or score for a particular confidence subject can be the sum of all articles (indexed i) over a given period of time $s_j=\Sigma t_i a_i p_i$, where $t_i$ is the tonality of an article, multiplied with an article weighting factor (prominence) multiplied by a weighting factor of the publication source $p_i$. The values $s_j$ is derived in such a way so the scorecards can be compared to a scorecard of a competitor and with the results of prior time intervals. An example of such scorecards making up the above mentioned chart of accounts is shown in Table 1 and Table 3.

The identification of the confidence subjects may be carried out by a media analyst or alternatively/additionally by computer-aided mechanisms, such as self-organizing maps (SOM), single-layer rectangular-shaped neural networks with unsupervised learning) and linguistic rule-based approaches applying contextual grammar rules for subject recognition.

Figure 8:
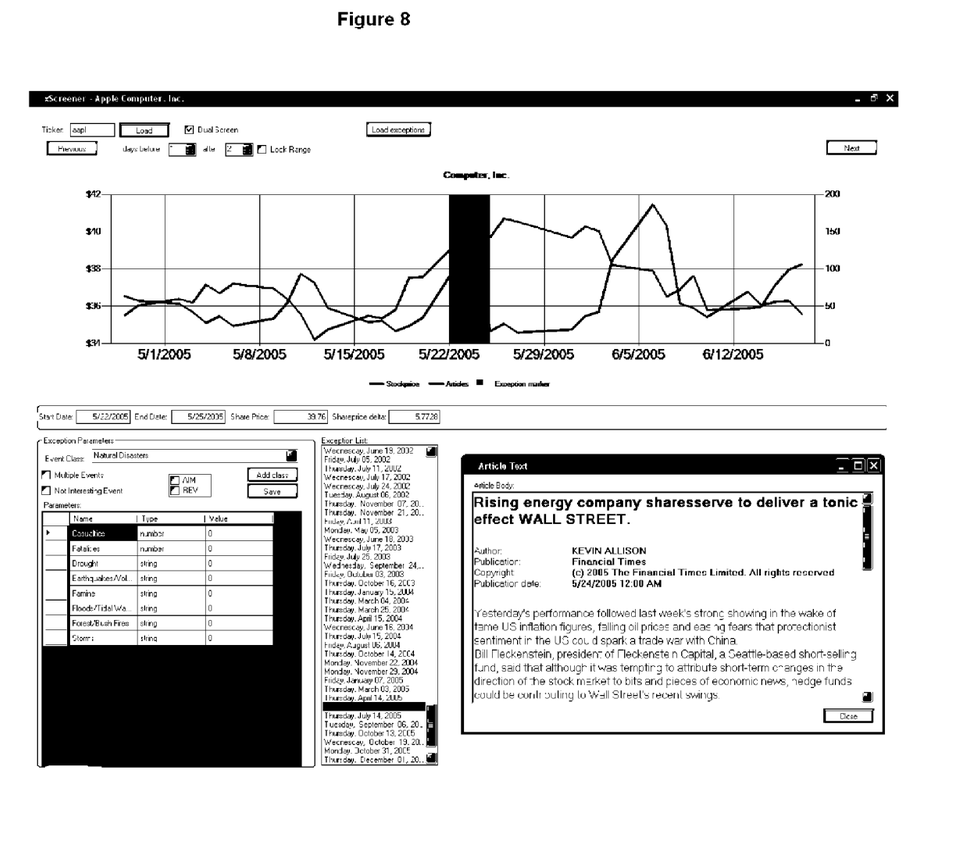
FIG. 8 illustrates an exemplary embodiment of a user interface for supporting the identification and evaluation of confidence subjects according to an exemplary embodiment of the disclosed method.

FIG. 8 shows an exemplary embodiment of a user interface for supporting the identification and evaluation of confidence subjects. The top half contains two curves over time: the stock price and the volume of articles for that particular company. The bottom half shows, on the right, the text of a particular article, and on the left, a small table of confidence subjects, on which the media analyst can populate the confidence subject values (or "n/a" if that subject is not mentioned in the article). Practical experience has shown that for companies with small market capitalization, the media volume is within a range that every article can be analyzed. For large companies this can be impractical, and a selected sub-sample can be used and the results extrapolated.

Figure 9:
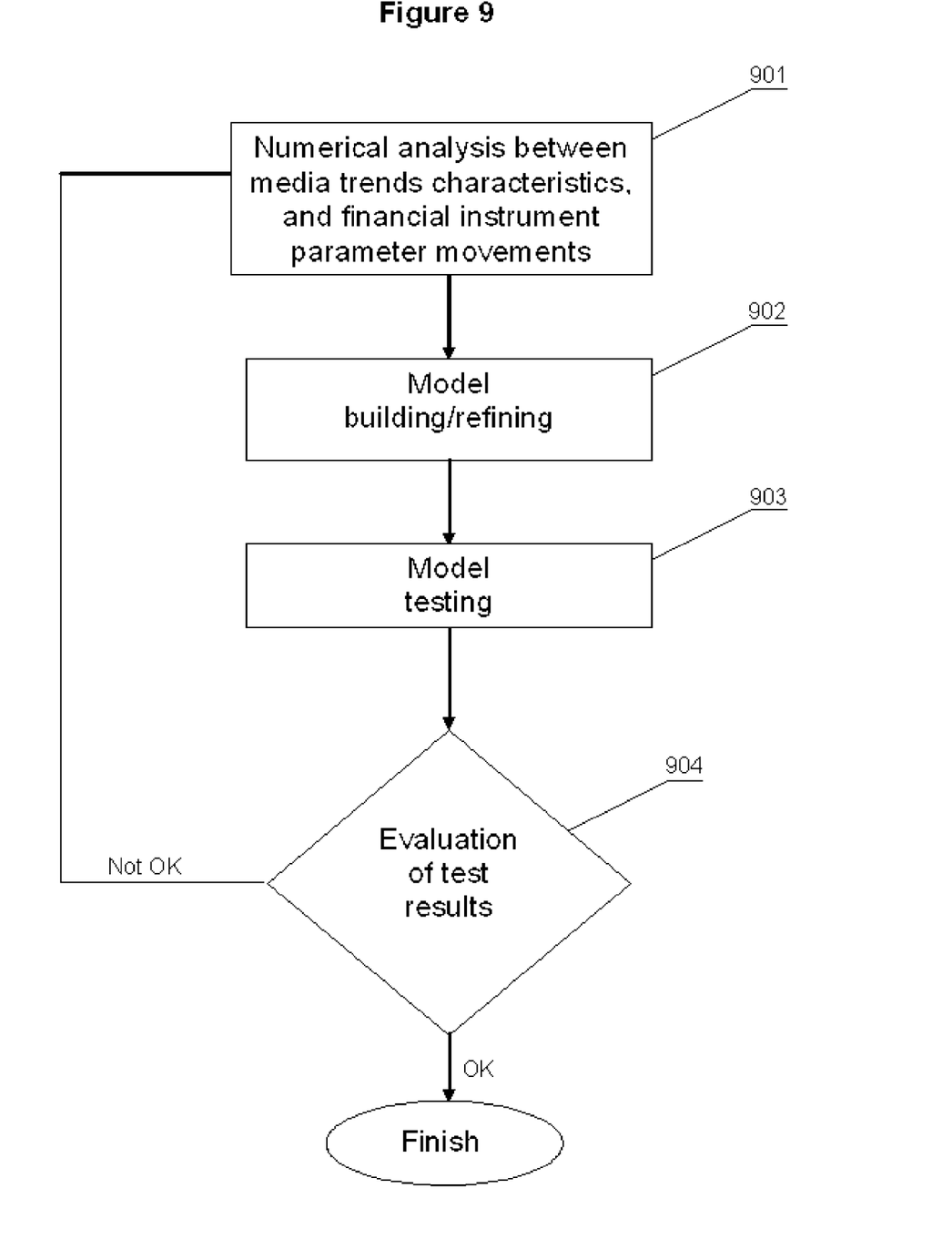
FIG. 9 illustrates exemplary processes for establishing a model for determining the influence media coverage regarding confidence subjects according to an exemplary embodiment of the disclosed method.

Exemplary details regarding the modeling the influence of confidence subject as shown in block 104 of FIG. 1 is shown in FIG. 9 and can be performed by extracting the coefficients between confidence subjects (in the example, changes $C_j$ on score values $s_i$) and the identified spread between trading prices and coterminous analyst target (forecasted) prices. Analysis (correlation, covariance, or any other type of statistical analysis) between media trend characteristics and financial instrument parameters movements is performed in block 901. Based on the extracted coefficient values that indicate a high degree of correlation and statistical significance, a model of how the confidence subjects and their media coverage influence the price movement of the financial instrument (in our example the values $R_i$) is built or refined in block 902. The fields of psychometric and econometric modeling have provided known research on the actual details of an analytical extraction of coefficients ($R_i$), and modeling cause and effects, for example, via factor analysis or structural equation models (SEM) that can contain exogenous, endogenous, observed, and latent variables. Alternatively, more numerically driven approaches can be performed using multilayered feed-forward neural networks (or similar) with supervised learning (back-propagation, simulated annealing, genetic algorithm, and others). The overall methodology for quantitative indication of the influence of certain confidence subjects to financial instrument value movements described herein is not limited to one specific choice of analysis correlation or covariance, for example.

In block 903, the model is tested against historical data that has not been used in the building of the model at 902. A decision in sub-process 904 determines whether the model is deemed to fit the data sufficiently well (if so, the process Modeling (104) is complete), or whether any discrepancies in the fit are sufficiently large as to warrant a further refinement of the model 902. The existing embodiment of the invention currently does not include an automated feedback loop 904 to 901 whereby insights gained during testing are automatically adjusting the coefficients in the model.

One possible approach to characterize a past or present media trend can be to use the following Equation:

$$\Sigma I_i = \Sigma\Sigma\Delta(t_{i,j}a_{i,j}p_{i,j})R_i$$

where $\Delta$ is the change in value of the term in parentheses over two points in time, $t_{i,j}$ is the tonality of an article j about confidence subject i, multiplied with an article weighting factor (prominence) $a_{i,j}$, multiplied by a weighting factor of the publication source $p_{i,j}$, $R_i$ is the coefficient for confidence subject I and $I_i$ the resulting impact on financial instrument for confidence subject i. The methodology presented in this document here is not limited the use of the above equation, other forms, in particular non-linear differential equations, may also be used.

When the latest trained model is used, the characterization of the present media trend is used to update the trained model. A user can continue to train a model by periodically, such as daily, characterizing media trends and inputting parameters related to financial instruments. This will provide specific media trend confidence subject data to the trained model related to the specific financial instrument of interest, or provide an analysis of the present media trend based on the characterized past media trends in the trained model.

An exemplary embodiment of the invention uses a monthly change of stock prices movements vs. monthly average of analyst expectations (even though the latter may not be shifting that frequently and other time intervals can be chosen). A certain time span is required in order to achieve a statistically significant volume of press coverage and therefore meaningful values for the individual confidence factors.

Prediction Process

FIG. 2 depicts an exemplary prediction process where the media evaluation 201 includes the extraction of the confidence subject values (media trend characteristics) described earlier in the section "training process". Along with the financial parameters 202, one can use these values as inputs to calculate 203 (also shown earlier in the example) a confidence-driven influence on the stock price of the company in question or other financial parameter. An underlying assumption that media coverage can influence investor confidence significantly represents a valuable additional component to the existing factors in securities valuation models. In particular, the above mentioned coefficients can be used to correlate the media coverage factors with the spread between the mean analyst target stock price and the trading price for the same trading period. Therefore, parameters of a specific financial instrument of interest can be input into the trained model, as well as data developed to a characterize present media trend related to the specific financial instrument or entity. A resulting output value is determined by performing an analysis of the data characterizing the present media trend and the parameters of the specific financial instrument using the trained model. The output result can be values correspond to parameters of the specific financial instrument or entity, such as predicted fair market value, or values corresponding to the characterization of the present media trend, such as market confidence in the performance of a CEO.

The output result can be an overall impact value that is calculated using an equation: $\Sigma I_i = \Sigma\Sigma\Delta(t_{i,j}a_{i,j}p_{i,j})R_i$, where $\Delta$ is a change in value of the term in parentheses over two points in time, $t_{i,j}$ is a tonality of an article j about confidence subject i, multiplied with an article weighting factor (prominence) $a_{i,j}$, multiplied by a weighting factor $p_{i,j}$ of the publication source, $R_i$ is a coefficient for confidence subject i, and a resulting impact on financial instrument for confidence subject i. Note that this is the same equation that is used to characterize a media trend. The methodology presented in this document here is not limited the use of the above equation, other forms, in particular non-linear differential equations, may also be used.

As a prediction, the result can be a value corresponding to the parameters of the specific financial instrument, or a value corresponding to the characterization of the present media trend. For example, the overall impact value $\Sigma I_i$ can be normalized for use in determining the effect of the present media trend on the confidence subject CEO Reputation from Table 1-3 above. Alternatively, the financial instrument fair market share price value can be multiplied by the overall impact value $\Sigma I_i$ and the percentage taken to determine the percentage decrease (as in Table 1) or increase in fair market share price value.

The outputted result can be an input value into another financial model used to determine whether the specific financial instrument should be bought or sold. Of course, the parameters of different financial instruments can be input into the system to determine the effect of the present media coverage based on the output values has on each of the different financial instruments. The output result values for each of the different financial instruments can be compared, and further analyzed.

Due to the quantifiable correlation of company-relevant issues discussed in the media with the aforementioned spread, it is possible to make visible the media influence on confidence, to serve as an indicator. It can be used as input into public relation strategies, such as media campaigns, investor relations, government relations, political campaigns and the like, or communication practices, such as advertising decisions, word usage in communications, and the like. Companies and other entities can take more proactive and targeted measures to positively influence their confidence subject scores on the chart of accounts, and, by consequence, their stock price. Of value here will also be easily derivable industry and company confidence volatility indices, which could inform the investment community and the companies themselves of their contextual reputation stability (i.e. how much present media coverage will affect financial instruments or investor confidence in the reputation of the company).

An exemplary embodiment can include an automated feedback loop whereby insights gained during regular operations are used for automatically adjusting the coefficients (204 in FIG. 2). Studies in particular in the field of neural networks have described various approaches of implementing an automated feedback loop.

It should be understood that the above only illustrates examples whereby the present invention, as defined by the appended claims, may be carried out, and that various modifications, and/or alterations may be made thereto without departing from the spirit of the invention or scope of the claims.

What is claimed is:

1. A method for numerical analysis by a computer of media influence on a value of a financial instrument, comprising:

reviewing media coverage related to a media trend, wherein the media coverage is received by the computer from a media data provider via a communication network;

identifying and storing a plurality of confidence subjects in the media coverage related to a corresponding historic financial parameter of a financial instrument, wherein each confidence subject is associated with a perception by the public of a company associated with the financial instrument, and further wherein at least two different types of confidence subjects are included in the plurality of confidence subjects including at least one financial confidence subject type and at least one non-financial confidence subject type;

characterizing a first media trend by determining a tonality value, representing a sentiment expressed in media coverage, and a prominence factor value, computed by the computer from a publication weighting factor and an article weighting factor, of the media coverage with respect to each of the plurality of confidence subjects;

establishing a model by characterizing the first media trend and the corresponding historic financial parameter of the financial instrument, wherein establishing the model comprises:

identifying a parameter value for each of a plurality of financial instruments that have a spread between a forecast financial value for each of the plurality of financial instruments and an actual financial value of each of the plurality of financial instruments, wherein the spread exceeds a predetermined threshold value;

inputting a parameter of a financial instrument of interest and data developed by characterizing a present media trend related to the financial instrument of interest into the model, wherein the characterizing of the first or present media trend comprises:

$\Sigma I_i = \Sigma\Sigma \Delta(t_{i,j} a_{i,j} p_{i,j}) R_i$, where $\Delta$ is a change in value of the term in parentheses over two points in time, $t_{i,j}$ is a tonality of an article j about confidence subject i, multiplied with an article weighting factor (prominence) $a_{i,j}$, multiplied by a weighting factor $p_{i,j}$ of the publication source, $R_i$ is a coefficient for confidence subject i, and $I_i$ the resulting impact on financial instrument for confidence subject I and $\Sigma I_i$, is the overall impact value that characterizes the first or present media trend;

automatically performing, by a computer system, an analysis of the data characterizing the present media trend and the parameter of the financial instrument of interest using the model;

based on said analysis, automatically calculating a result, wherein the result is an overall impact value calculated using the equation $\Sigma I_i = \Sigma\Sigma \Delta(t_{i,j} a_{i,j} p_{i,j}) R_i$;

providing the result, $\Sigma I_i$, into a financial model on the computer that determines whether the financial instrument of interest should be bought or sold; and outputting the result, $\Sigma I_i$, of the analysis to a graphical user interface display.

2. The method of claim 1, wherein the data characterizing the present media trend is developed by:

reviewing present media coverage;

identifying the plurality of confidence subjects in the present media reports related to the value of the financial instrument of interest; and determining a tonality value and a prominence factor value of the present media report with respect to each of the confidence subjects.

3. The media of claim 1, wherein an outputting of the result comprises calculating an impact value $\Sigma I_i$ using an equation:

$\Sigma I_i = \Sigma\Sigma \Delta(t_{i,j} a_{i,j} p_{i,j}) R_i$, where $\Delta$ is a change in value of the term in parentheses over two points in time, $t_{i,j}$ is a tonality of an article j about confidence subject i, multiplied with an article weighting factor (prominence) $a_{i,j}$, multiplied by a weighting factor $p_{i,j}$ of the publication source, $R_i$ is a coefficient for confidence subject i, and $I_i$ a resulting impact on financial instrument for confidence subject i.

4. The method of claim 1, wherein the inputting, performing and outputting are repeated for a number of different financial instruments as the financial instrument of interest and the outputted results are compared.

* * * * *

UNITED STATES PATENT AND TRADEMARK OFFICE
CERTIFICATE OF CORRECTION

PATENT NO. : 7,664,693 B1 Page 1 of 1
APPLICATION NO. : 11/309049
DATED : February 16, 2010
INVENTOR(S) : von Groll et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Thirtieth Day of November, 2010

David J. Kappos
*Director of the United States Patent and Trademark Office*